March 6, 1934. E. H. EWERTZ 1,950,234
TANK CONSTRUCTION
Filed Nov. 28, 1930
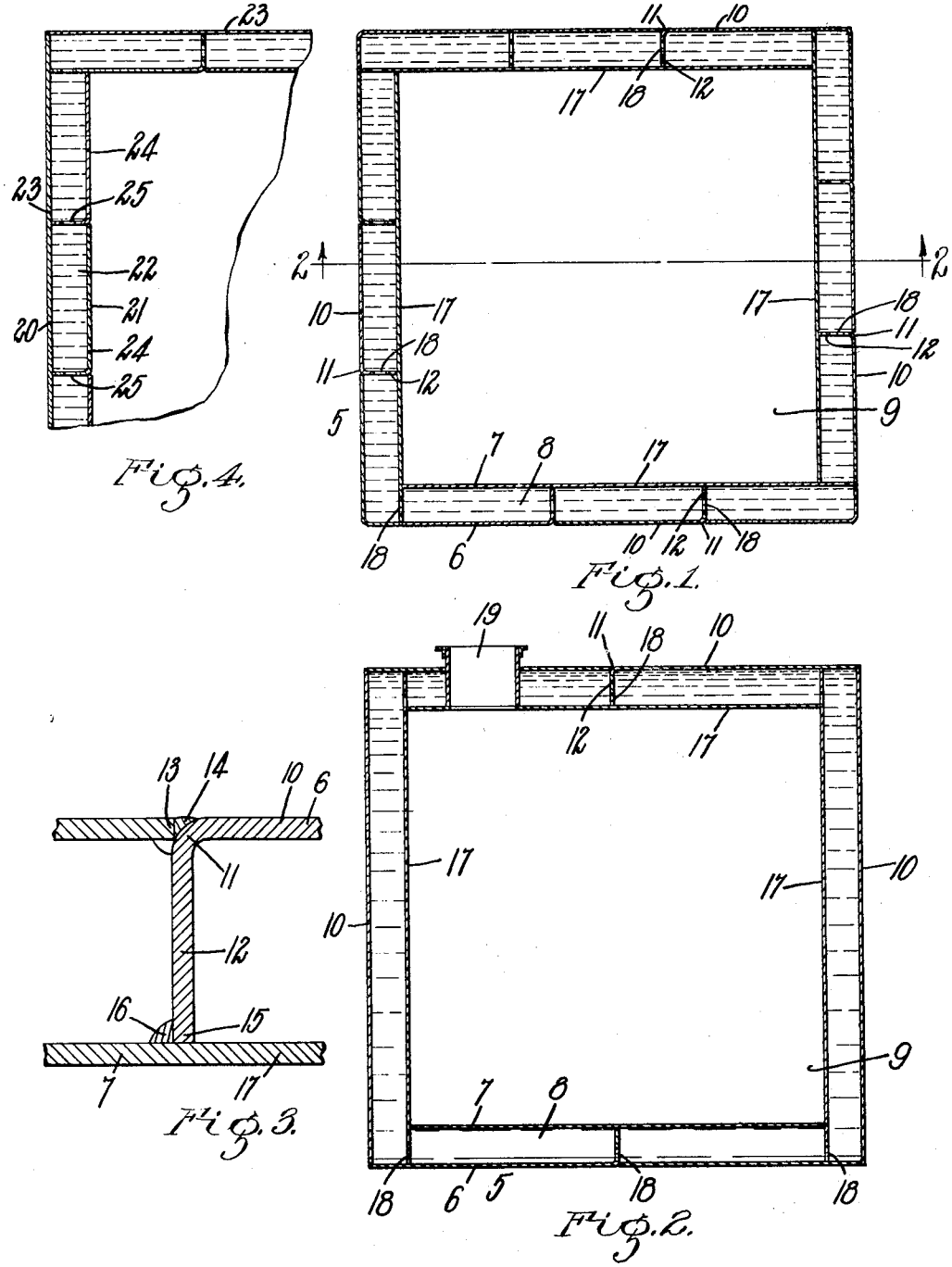

Patented Mar. 6, 1934

1,950,234

UNITED STATES PATENT OFFICE 1,950,234

TANK CONSTRUCTION

Eric H. Ewertz, Elizabeth, N. J.

Application November 28, 1930, Serial No. 498,545

2 Claims. (Cl. 220—13)

This invention relates to an improvement in tank constructions and particularly to a type of tank which may be used for the safe storage of volatile or inflammable liquids.

The object of the invention is to provide a tank of strong construction embodying therein outer and inner walls provided with a space therebetween, said walls being constructed of plates which are welded one to another and certain of said plates embodying therein flanges which extend across said space and are welded to intermediate portions of plates of the opposite wall.

Another object of the invention is to provide an oil storage tank constructed in such a manner that the usual fire hazards that are present where oil is stored will be so reduced that it will not be necessary to bury the tanks in the ground when they are used within the city limits, this result being attained by filling the space between the outer and inner walls with a suitable insulating material preferably a liquid under pressure, it being possible, furthermore, to utilize said liquid as a pressure fluid in forcing the oil out of the tank.

The invention consists in a tank as set forth in the following specification and particularly as pointed out in the claims thereof.

Referring to the drawing:—

Fig. 1 represents a horizontal sectional view through a tank constructed in accordance with my invention.

Fig. 2 is a vertical section taken on the line 2—2 of Fig. 1.

Fig. 3 is an enlarged detail sectional view illustrating the manner in which the outer and inner plates of the tank are secured together.

Fig. 4 is a sectional view illustrating a modified embodiment of my invention.

Like numerals refer to like parts throughout the several views of the drawing.

In the drawing, referring to Figs. 1 to 3 inclusive, 5 represents a tank embodying therein an outer wall 6 and an inner wall 7, between which is an insulating space 8. The space within the tank between the sides of the inner wall 7 constitutes a storage chamber 9.

The several sides of the outer wall 6 are constructed of a plurality of similarly formed plates 10, each of which is bent at 11 to form a flange 12 which is perpendicular to the main portion of the plate. The plates 10 are secured one to another by welding an edge portion 13 of one plate to the bent portion 11 of an adjacent plate as at 14, see Fig. 3, the welding operation fusing the adjacent portions of the plates together in a well-known manner.

The outer and inner walls 6 and 7 respectively are secured one to another by welding an edge portion 15 of each flange 12 to an intermediate portion of a plate the inner wall as at 16, see Fig. 3. The several sides of the inner wall 7 are preferably constructed of single plates 17.

All of the abutting edges or sides of the various plates are welded together in a manner to form an exceedingly strong and rigid construction and at the same time to provide leak-proof joints where the various plates abut together. The space 8 between the outer and inner walls 6 and 7 respectively may be filled with any suitable form of insulating material depending upon the purpose for which the tank is to be utilized, but preferably I fill this space with water under slight pressure and this water may be utilized as the pressure fluid of a hydraulic system such as "The hard tank system" which is employed to force oil located in the storage chamber 9 out of said chamber. Openings 18 are provided in the flanges 12 in order that the liquid in the space 8 may circulate freely therethrough. A manhole 19 is provided at the top of the tank communicating with the storage chamber 9. Other connections may be supplied as required.

In Fig. 4, I have illustrated a corner portion of a tank also constructed in accordance with my invention. In this construction 20 represents an outer wall, 21 an inner wall and between these walls is an insulating space 22. The several sides of the outer wall 20 are constructed of single plates 23 and the several sides of the inner wall 21 are constructed of a plurality of plates 24, each of which is bent to form a flange 25 which is perpendicular to the outer face of the plate. The abutting edges and sides of the plates of both of the walls are welded one to another and the outer edge of the flange 25 is welded to the inner face of the plates 20. In all respects the construction of this tank is the same as the tank illustrated in Figs. 1 to 3 inclusive except that the flanges that space the outer and inner walls apart and act as stiffeners for said walls are formed integral with the inner wall instead of the outer wall.

I claim:

1. A tank having, in combination, an outer and an inner wall provided with a space therebetween, both of said walls being constructed of plates welded one to another, certain of said plates extending beyond the edges of opposite plates and having flanges embodied therein which extend across said space and position the walls apart, the edges of said flanges being welded to intermediate portions of adjacent plates.

2. A tank having, in combination, an outer and an inner wall provided with a space therebetween, both of said walls being constructed of plates welded one to another, certain of said plates extending beyond the edges of opposite plates and having flanges formed integral therewith which extend perpendicular to a face thereof and across said space, an edge of each of said flanges being welded to an intermediate portion of the face of an opposite plate.

ERIC H. EWERTZ.